United States Patent
Yi et al.

(10) Patent No.: US 6,395,144 B1
(45) Date of Patent: May 28, 2002

(54) METHOD FOR TREATING TOXIC COMPOUNDS-CONTAINING GAS BY NON-THERMAL PLASMA

(75) Inventors: Hun Jung Yi; Yeon Seok Choi; Young Hoon Song; Seock Joon Kim, all of Taejon (KR)

(73) Assignee: Korea Institute of Machinery and Materials, Taejon (KR)

( * ) Notice: Subject to any disclaimer, the term of this patent is extended or adjusted under 35 U.S.C. 154(b) by 0 days.

(21) Appl. No.: 09/614,695

(22) Filed: Jul. 12, 2000

(30) Foreign Application Priority Data

May 16, 2000 (KR) ............................................ 00-26135

(51) Int. Cl.[7] ................................................. H05F 3/00
(52) U.S. Cl. ....................... 204/164; 588/204; 588/210; 588/212; 588/227
(58) Field of Search .......................... 204/164; 588/204, 588/210, 212, 227

(56) References Cited

U.S. PATENT DOCUMENTS

| | | |
|---|---|---|
| 3,983,021 A | 9/1976 | Henis |
| 4,954,320 A | 9/1990 | Birmingham et al. |
| 5,236,672 A | 8/1993 | Nunez et al. |
| 5,609,736 A * | 3/1997 | Yamamoto .................. 204/164 |
| 5,843,288 A | 12/1998 | Yamamoto |

* cited by examiner

Primary Examiner—Arun S. Phasge
(74) Attorney, Agent, or Firm—Oliff & Berridge, PLC

(57) ABSTRACT

Disclosed is a non-thermal plasma method for treating a toxic compounds-containing gas; the method comprising the steps of: filling alkali earth metal catalysts and dielectrics within a plasma reactor; the alkali earth metal catalysts being made by substituting alkali earth metal cations for cations of aluminum/silicon molecular sieves used as carriers; introducing a toxic compounds-containing gas into the plasma reactor; and supplying AC power or pulse power to the plasma reactor generating a non-thermal plasma and thus decomposing or oxidizing the toxic compounds. Also to stabilize the plasma more during the non-thermal plasma process and to enhance treatment efficiency of the toxic compounds, the catalysts substituted by the alkali earth metal are filled together with the well-known dielectrics within the plasma reactor; the alkali earth metal catalysts being electrically less conductive and inexpensive.

9 Claims, 2 Drawing Sheets

METHOD FOR TREATING TOXIC COMPOUNDS-CONTAINING GAS BY NON-THERMAL PLASMA

BACKGROUND OF THE INVENTION

1. Field of the Invention

The present invention relates to a method for treating a noxious gas by a non-thermal plasma, and more particularly to a method for treating a toxic compounds-containing gas by a non-thermal plasma, which removes a possibility of the generation of arc by providing catalysts being electrically less conductive, thereby realizing the generation of a stable non-thermal plasma at a low cost and an enhanced efficiency of the treatment.

2. Description of the Related Art

Almost all of volatile organic compounds (VOCs) exhausted inevitably from most industrial processes are known to do direct harm to the human body and become causal materials generating photochemical smog in the atmosphere. By reason of this, most countries enforce various laws for regulating the VOCs. Also, more and more strengthening restrictions are being imposed on the exhaustion of global-warming materials, such as perfluorocarbons (PFCs) and chlorofluorocarbons (CFCs), in accordance with international agreements, and these materials are expected to be regulated by the total amount of all the materials after the year 2002. Therefore, various methods for treating the toxic compounds are currently used in practice, such as an incineration method, a catalytic method, an adsorption method and a biological method. There, however, is a common recognition that these existing methods do not satisfy requirements for exhausting noxious gases in various industrial processes with respect to the strengthening regulations. For example, each of the incineration method and the catalytic method requires a high-temperature heating source regardless of its type, which makes it difficult to apply these methods to ultra-clean semiconductor processes having technical troubles in providing the high-temperature heating source.

On the other hand, there is an alternative to the incineration method and the catalytic method, a non-thermal plasma method capable of decomposing and oxidizing toxic compounds without using any high-temperature heating source. A plasma is generated by supplying high-voltage DC, AC or pulse power to electrodes opposing each other and thus separating gas molecules having originally electrical neutrality into electrons and cations having polarities. The plasma is divided into two types, namely a non-thermal or low-temperature plasma having tens of thousands degrees of temperature and an ultrahigh-temperature nuclear fusion plasma having tens of millions degrees of temperature. The non-thermal plasma is used more actively in industry than the ultrahigh-temperature nuclear fusion plasma. In the case of the non-thermal plasma, there is no or little increase in process temperature because electrical energy is supplied only to electrons having an ability to use the energy for a chemical reaction by virtue of designs of (1) placing a dielectric barrier between the electrodes, (2) supplying power repeatedly for a time of 1000 nanoseconds so as not to heat the ions or (3) allowing a flow rate of gas molecules passing between the electrodes to be faster. In recent, there is a preference to a method for generating non-thermal plasma by filling electrical dielectrics or strong dielectrics between a pair of electrodes and supplying high-voltage AC power.

A typical example of the present time using the non-thermal plasma under the atmosphere is an ozone-generating device that was developed 150 years ago by Siemens. In the year 1976, Henis disclosed a method for treating a toxic compounds-containing gas by filling dielectrics between metal electrodes opposing each other, supplying high-voltage AC power to generate the non-thermal plasma, and then passing the gas through the non-thermal plasma (See U.S. Pat. No.3,983,021). In addition to the ozone-generating techniques, treating process techniques of nitrogen oxides, VOCs, dioxin, bad-smelling substances, PFCs and CFCs using non-thermal plasma have been developed actively during the past 10 years. Nunez et al. has disclosed that toxic compounds including VOCs can be removed by filling $BaTiO_3$ pellets or beads as the strong dielectrics between metal electrodes of a non-thermal plasma reactor, supplying high-voltage AC power to generate the non-thermal plasma, and then passing toxic compound-containing gas through the dielectrics (See U.S. Pat. No. 5,236,672). Birmingham et al. has also disclosed a method for decomposing noxious gas and toxic compounds in a non-thermal plasma reactor by supplying high-voltage AC power. This method is characterized in that dielectric pellets or beads filled within the reactor are not limited to $BaTiO_3$, but include glass, ceramic, pyrex and the like. This method is also characterized in that a catalytic process is performed simultaneously with the non-thermal plasma process by adding a Pt-Pd-Rh catalyst which is a noble metal catalyst (See U.S. Pat. No. 4,954, 320). Besides, Yamamoto has disclosed a technique using a non-thermal plasma reactor and a power supplier similar to those of Nunez et al. and Birmingham et al., but having a difference in that $BaTiO_3$ beads filled between electrodes are coated, at surfaces thereof, with Pt, Pd, Rh, Co, Ni or V as transition metal group catalysts to reduce by-products produced in the non-thermal plasma process (See U.S. Pat. No. 5,843,288).

As described above, Pt, Pd, Rh, Co, Ni and V belonging to the transition metal group are proposed as the catalysts used in the conventional non-thermal plasma processes. In this case, however, there are some problems in that (1) using these transition metal group catalysts in the high-electric field plasma reactor increases a possibility of generating an arc as an obstacle to the formation of stable non-thermal plasma, and (2) the noble metal catalysts used mainly among the transition metal group catalysts are expensive. Also, reducing the amount of coating of the transition metals causes a degradation in catalytic performance. This problem may be solved using an increased amount of dielectric pellets or beads. In this case, however, the non-thermal plasma techniques may not be applied to most industrial processes involving a larger flow rate of exhaust gas because a pressure drop within the reactor is greater. Thus, there is a desire to develop a catalyst that can be activated vigorously by non-thermal plasma while being electrically non-conductive or less conductive.

SUMMARY OF THE INVENTION

Accordingly, the present invention has been made to solve the above-mentioned problems occurring in the prior art, and it is an objective of the present invention to provide a method for treating a toxic compounds-containing gas by a non-thermal plasma, which removes a possibility of the generation of arc by providing catalysts being electrically less conductive, thereby realizing the generation of a stable non-thermal plasma at a low cost and an enhanced efficiency of the treatment.

To achieve this objective, there is provided a method for treating a toxic compounds-containing gas by a non-thermal plasma, the method comprising the steps of:

filling alkali earth metal catalysts and dielectrics within a plasma reactor, the alkali earth metal catalysts being made by substituting alkali earth metal cations for cations of aluminum/silicon molecular sieves used as carriers;

introducing a toxic compounds-containing gas into the plasma reactor; and supplying power to the plasma reactor to generate a non-thermal plasma and thus decomposing or oxidizing the toxic compounds.

BRIEF DESCRIPTION OF THE DRAWINGS

The above objectives, and other features and advantages of the present invention will become more apparent after a reading of the following detailed description when taken in conjunction with the drawings, in which.

DETAILED DESCRIPTION OF THE PREFERRED EMBODIMENTS

Figure 1:
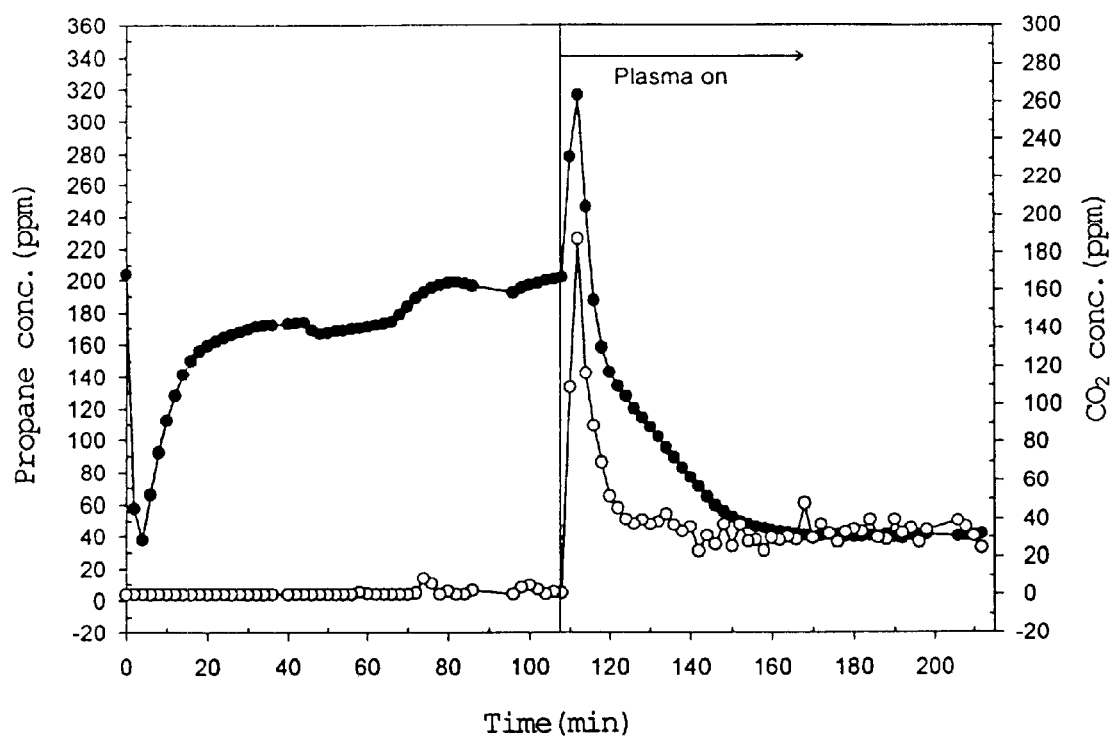
FIG. 1 is a graph showing reduction in a concentration of propane according to the treating method of the present invention.

Hereinafter, preferred embodiments of the present invention will be described with reference to the accompanying drawings.

The present invention provides a method for treating a toxic compounds-containing gas by a non-thermal plasma, which removes a possibility of the generation of arc by providing catalysts being electrically less conductive, thereby realizing the generation of a stable non-thermal plasma at a low cost and an enhanced efficiency of the treatment.

This method involves filling alkali earth metal catalysts and dielectrics within a plasma reactor, the alkali earth metal catalysts being made by substituting alkali earth metal cations for cations of aluminum/silicon molecular sieves used as carriers. The method also involves introducing a toxic compounds-containing gas into the plasma reactor, and supplying electric power to the plasma reactor to generate a non-thermal plasma and thus decomposing or oxidizing the toxic compounds.

In the method for treating a toxic compounds-containing gas according to present invention, the aluminum/silicon molecular sieves used as the carriers in making of the alkali earth metal catalysts are not limited to a specific composition ratio between the aluminum and the silicon and to a specific structure, and bead-shaped, pellet-shaped or honeycomb-shaped carriers are all preferable. Also, it is preferred to use Ba, Sr or Ca as the alkali earth metal, which elements have nearly no electrical conductivity and are very inexpensive. The alkali earth metal catalysts used in the method of the present invention are electrically sufficiently less conductive to prevent the generation of an arc even if they are placed within a strong electric field, which leads to an advantage of the generation of a stable non-thermal plasma. Another advantages of the alkali earth metal catalysts are in that they are effectively activated only by a non-thermal plasma dissimilar to the case of transition metal catalysts being activated by a heating source, and their costs are very low. Therefore, if the non-thermal plasma is generated in the presence of the alkali earth metal catalyst, it is possible to treat toxic compounds in air more efficiently than in the conventional non-thermal plasma processes.

Further, the dielectrics are not limited to $BaTiO_3$, i.e., a strong dielectric, but it is of no great matter to use dielectrics made of a general material, such as glass, ceramic or pyrex, and there is no limitation to the shape of the dielectrics. Furthermore, the toxic compounds may include at least one of VOCs, PFCs, CFCs, dioxin, nitrogen oxides and other various toxic organic and inorganic materials being able to be decomposed by plasma. On the other hand, the electric power supplied to the plasma reactor may be any one of AC power having a voltage of 20 to 100 kV and pulse power having a pulse width of 10 to 1,000 nanoseconds. For the AC power or pulse power, a frequency in the wide range of 60 Hz to 10 kHz may be used without having any adverse effect on the generation of stable non-thermal plasma.

In accordance with the treating method of the present invention, the plasma reactor may be further filled with cocatalysts substituted by a transition metal, such as Pt, Pd, Rh or V, together with the alkali earth metal catalysts and the dielectrics. The cocatalysts serve to strengthen the durability of the catalysts during the treatment of the toxic compounds-containing gas while relieving a catalyst toxicity, and obtaining synergic effects over the wide range of temperature from room temperature to several hundred degrees °C. Also, water or hydrogen peroxide may also be added to the toxic compounds-containing gas prior to introducing the gas into the plasma reactor so as to enhance a formation of O, OH and/or $HO_2$ radicals exhibiting a strong oxidizing effect during the generation of the plasma. Further, argon gas or helium gas may be introduced into the plasma reactor together with toxic compounds-containing gas, so as to allow the generated non-thermal plasma to be more stabilized.

Besides, it is possible for contents of oxygen, nitrogen, moisture, carbon dioxide, etc. in the toxic compounds-containing gas to vary in accordance with application fields of the present invention and process characteristics. In particular, the moisture and oxygen contents of the gas may be appropriately adjusted prior to the introduction of the toxic compounds-containing gas into the reactor, in order to obtain an enhanced treatment performance for the gas. The treating method of the present invention is less restricted by conditions of a temperature and a pressure, so that it can be applied under the condition of temperature from room temperature to several hundred degrees so long as the stable non-thermal plasma is maintained.

The present invention will now be described in detail with reference to the following examples, but the present invention is not to be construed as being limited thereto.

EXAMPLE 1

Figure 2:
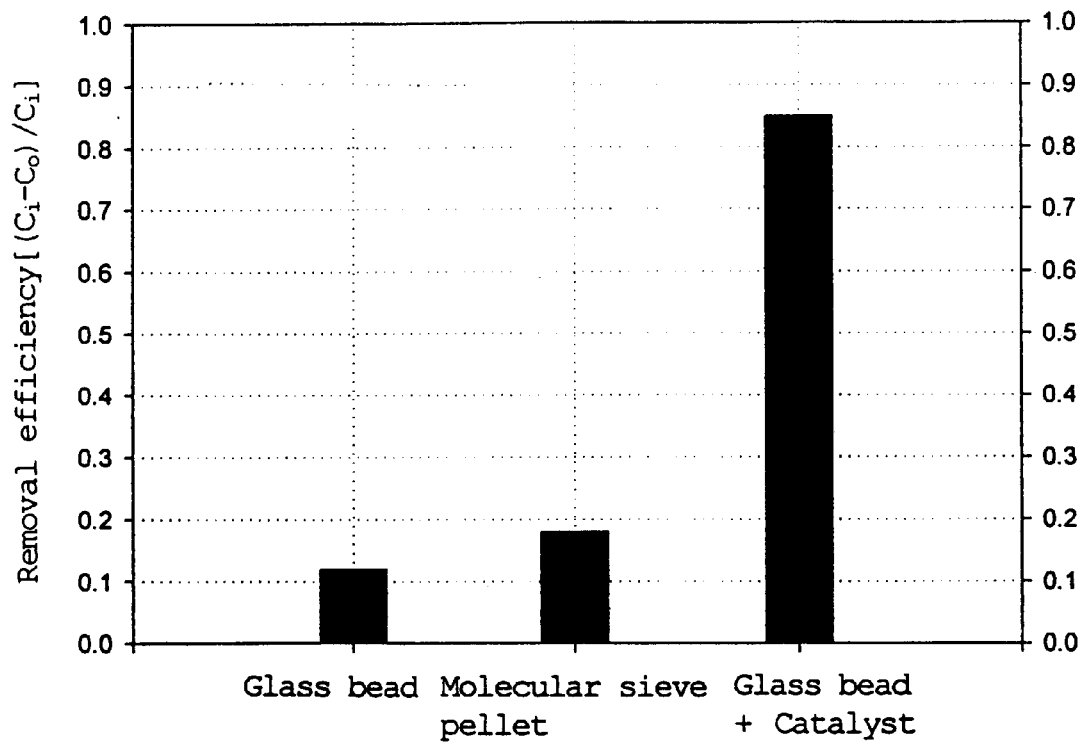
FIG. 2 is a graph showing an effect of alkali earth metal catalysts on improvement in a removal efficiency of propane by the non-thermal plasma.

Cations of carriers consisting of aluminum/silicon molecular sieves and having a spherical or oval pellet shape with a mean diameter of 5 mm were primarily exchanged using a 0.5 M $BaCl_2$ solution at a temperature of 80° C., and then were exchanged secondarily and thirdly in the same manner as above, after being filtered, cleaned and dried, to make alkali earth metal catalyst pellets substituted by Ba. Thereafter, the Ba-substituted catalyst pellets together with dielectrics of glass beads were filled within a plasma reactor, and then air containing a propane gas of 200 ppm was introduced into the plasma reactor at a flow rate of 10 liter/min while measuring a concentration of the propane at an inlet and an outlet of the reactor by means of measuring instruments. At an early stage of the introduction of the propane, it took the propane 110 minutes to be measured at the outlet in the same amount as that introduced into the inlet because of a partial adsorption of the propane occurring within the reactor (See FIG. 1). After the propane was measured at the outlet in the same concentration of that measured at the inlet, AC power having a maximum voltage of 20 to 30 kV or pulse power having a pulse width of 100 to 1,000 nanoseconds was supplied to the reactor to generate a non-thermal plasma. At this time, although the frequency of the AC power or pulse power was changed from 60 Hz to 10 kHz, there was no fatal problem arising due to the frequency change. As seen from FIG. 1, it was confirmed that the concentration of the propane at the outlet was lowered significantly with the passage of time after the plasma was generated (-●-: propane gas; -○-: carbon dioxide), and a removal efficiency was about 85% (v/v) (See FIG. 2). In FIG. 2, reference characters "$C_i$" and "$C_o$" designate the concentration of the propane at the inlet and the outlet, respectively. The fact that carbon dioxide was measured at the outlet indicated that the drop of the concentration of the propane through the plasma process was not due to adsorption of the propane within the reactor, but due to actual progression of an oxidation reaction of the propane. Also, though AC power must be supplied in conventional non-thermal plasma processes using transition metal catalyst beads or pellets, a stable non-thermal plasma was generated, regardless of the type of the electric power used, in this example using the alkali earth metal catalyst pellets according to the present invention. Also, it was unnecessary to use $BaTiO_3$, i.e., a strong dielectric.

EXAMPLE 2

Alkali earth metal catalyst pellets substituted by Sr were made by the same manner as Example 1, except that a 0.5 M $SrCl_2$ solution was used instead of the 0.5 M $BaCl_2$ in the step of making the catalyst. Thereafter, the Sr-substituted catalyst pellets together with glass beads were filled within a plasma reactor, and then air containing a propane gas of 200 ppm was introduced into the plasma reactor at a flow rate of 10 liter/min while measuring the concentration of the propane at an inlet and an outlet of the reactor by means of measuring instruments, as in the case of Example 1. After a saturated adsorption of the propane occurred, AC power having a maximum voltage of 20 to 30 kV or pulse power having a pulse width of 100 to 1,000 nanoseconds was supplied to the reactor to generate a non-thermal plasma. A removal efficiency obtained finally was about 87% (v/v), which value was similar to that obtained using Ba catalyst pellets of Example 1. Carbon dioxide was also detected as a final product of the oxidation reaction of the propane.

EXAMPLE 3

Alkali earth metal catalyst pellets substituted by Ca were made by the same manner as Example 1, except that a 0.5 M $CaCl_2$ solution was used instead of the 0.5 M $BaCl_2$ in the step of making the catalyst. Thereafter, the Ca-substituted catalyst pellets together with glass beads were filled within a plasma reactor, and a propane gas was introduced into the plasma reactor in the same manner as that of Example 1 to generate a non-thermal plasma. A removal efficiency obtained finally was about 80% (v/v), and carbon dioxide was detected as a final product of the oxidation reaction of the propane.

Comparative Example 1

A non-thermal plasma process was performed in the same manner as that of Example 1, except that instead of filling the alkali earth metal catalysts obtained from the above Examples 1 to 3, glass beads having neither catalytic performance nor adsorption performance or molecular sieve pellets having an adsorption performance while having no catalytic performance were filled alone within the reactor. As the result of that, removal efficiencies of the propane in all the cases of filling the glass beads or the molecular sieve pellets alone were only about 10 to 20% (v/v) while the removal efficiency of the propane in the case of filling Ba-substituted catalyst pellets together with the dielectrics was about 85% (v/v) as seen from FIG. 2. Particularly, the low removal efficiency involved in the case using molecular sieve pellets was not improved, in spite of an adsorption performance expected by those molecular sieve pellets. Accordingly, it is proved that the alkali earth metal catalysts of the present invention improve effectively the efficiency of removing the toxic compounds-containing gas in the plasma process.

EXAMPLE 4

Ba-, Sr-, or Ca-substituted alkali earth metal catalysts were made, and a non-thermal plasma process was performed in the same manner as that of Example 1, except that bead-shaped or honeycomb-shaped carriers were used instead of using spherical or oval carrier pallets. As the result of that, a highly stable non-thermal plasma was obtained, similarly to the case of using the pellet-shaped carriers, and the propane removal efficiency was also not lowered. Accordingly, it is recognized that there is no limitation to the shape of the carriers used in making alkali earth metal catalysts for the plasma process of the present invention, and thus the shapes of the bead, pellet and honeycomb can be optionally used.

EXAMPLE 5

A non-thermal plasma process was performed in the same manner as that of Example 1, except that air containing VOCs such as toluene or ethylene, PFC such as $NF_3$, or TFC (trichloroethylene) was introduced instead of air containing propane gas. As the result of that, removal efficiencies of these gases were not behind that in the case of the propane gas. Accordingly, it is recognized that materials to be treated by the method of the present invention are not limited to specific organic compounds, and thus the present invention can be applied widely to the decomposition of toxic compounds including VOCs, PFCs, CFCs, dioxin, nitrogen oxides and other various toxic organic and inorganic materials that are known to be able to be treated by plasma.

EXAMPLE 6

A non-thermal plasma process was performed in the same manner as that of Example 1, except that catalyst beads substituted by a transition metal, such as, Pt, Pd, Rh or V were used as a cocatalyst while using the Ba-substituted alkali earth metal catalysts obtained by Example 1 as a main catalyst. As the result of that, it is confirmed that there are synergic effects, such as, an increase in durability of the catalyst, a relief of catalyst toxicity and an enhancement in the processing performance for toxic compounds. These synergic effects are maintained over the wide range of a temperature from room temperature to several hundred degrees °C.

As described above, in the method for treating toxic compounds-containing gas according to the present invention, alkali earth metal catalysts are filled together with dielectrics within a plasma reactor to generate non-thermal plasma, the alkali earth metal catalysts being electrically sufficiently less conductive to prevent the generation of an arc even in the case of a strong electric field plasma reactor, thereby realizing the generation of stable non-thermal plasma at a low cost and thus significantly enhancing the removal efficiency of the toxic compounds. Also, there is little limitation to the application conditions to apply the method of the present invention to various situations requiring the treatment of the noxious and toxic compounds.

While the present invention has been illustrated and described under considering preferred specific embodiments thereof, it will be easily understood by those skilled in the art that the present invention is not limited to the specific embodiments, and various changes and modifications and equivalents may be made without departing from the true scope of the present invention.

What is claimed is:

1. A method for treating a toxic compounds-containing gas by a non-thermal plasma, the method comprising the steps of:

substituting alkali earth metal cations for cations of aluminum/silicon molecular sieves used as carriers to prepare alkali earth metal catalysts;

filling the alkali earth metal catalysts and dielectrics within a plasma reactor; introducing a toxic compounds-containing gas into the plasma reactor; and supplying electric power to the plasma reactor to generate a non-thermal plasma and thus decomposing or oxidizing the toxic compounds.

2. A method as claimed in claim 1, wherein the aluminum/silicon molecular sieves as the carriers have the shape of a bead, pellet or honeycomb.

3. A method as claimed in claim 1, wherein the alkali earth metal is Ba, Sr or Ca.

4. A method as claimed in claim 1, wherein material of the dielectric is glass, ceramic, pyrex or $BaTiO_3$.

5. A method as claimed in claim 1, wherein the toxic compounds are at least one selected from a group consisting of VOCs (volatile organic compounds), PFCs (perfluorocarbons), CFCs (chlorofluorocarbons), dioxin and nitrogen oxides.

6. A method as claimed in claim 1, wherein the electric power is AC power or pulse power.

7. A method as claimed in claim 1, wherein the alkali earth metal catalysts and the dielectrics are filled within the plasma reactor and transition metal cocatalysts substituted by Pt, Pd, Rh or V are further filled within the plasma reactor, thereby enhancing durability of the catalysts.

8. A method as claimed in claim 1, wherein water or hydrogen peroxide is added to the toxic compounds-containing gas so as to facilitate the formation of radicals.

9. A method as claimed in claim 1, wherein argon gas or helium gas is further introduced into the plasma reactor at the step of introducing the toxic compounds-containing gas, so as to stabilize the non-thermal plasma.

* * * * *